INVENTORS.
WALTER G. KRELLNER
ERLE I. SHOBERT, II
BY
Brown, Murray, Flick & Peckham
ATTORNEYS.

United States Patent Office 3,671,092
Patented June 20, 1972

3,671,092
SELF-ALIGNING BEARING
Walter G. Krellner and Erle I. Shobert II, St. Marys, Pa.,
assignors to Stackpole Carbon Company, St. Marys, Pa.
Filed Mar. 29, 1971, Ser. No. 128,846
Int. Cl. F16c 23/00
U.S. Cl. 308—72
7 Claims

ABSTRACT OF THE DISCLOSURE

A self-aligning bearing is formed from a one-piece metal member having a tubular central portion for receiving a rotating shaft, and supporting end portions for the tubular portion integral with its opposite ends. These supporting end portions are disposed around the outside of the tubular portion and are curved back over it. The outer surfaces of the supporting portions lie in an imaginary spherical surface having its center at the axis of the tubular portion of the bearing midway between its ends. This bearing is mounted in an opening through a bearing support provided with an encircling side wall curved to fit against the outer surfaces of the supporting end portions of the bearing so that the bearing can tilt in the opening in any direction.

---

At present, almost all self-aligning bearings for small motors and the like are made by powder metallurgy. Metal powder is mixed, pressed, sintered, repressed and impregnated with oil. Since the amount of oil that can be absorbed by the bearing is limited, such bearings have a life limited accordingly. In order to increase the life, it has been necessary in many applications to add a felt washer impregnated with oil to supply the extra oil that is required because of loss due to evaporation and creepage. Even then, in many cases the bearing fails before the commutator brushes, so there is a definite need for an improved bearing for such things as automotive heater motors, window lift motors and other auxiliary automotive equipment as well as for many other modern appliance motors.

It is among the objects of this invention to provide a self-aligning bearing which is very simple and inexpensive in construction, which can be made for very small shafts, and which is made from a single piece of metal.

Figure 1:
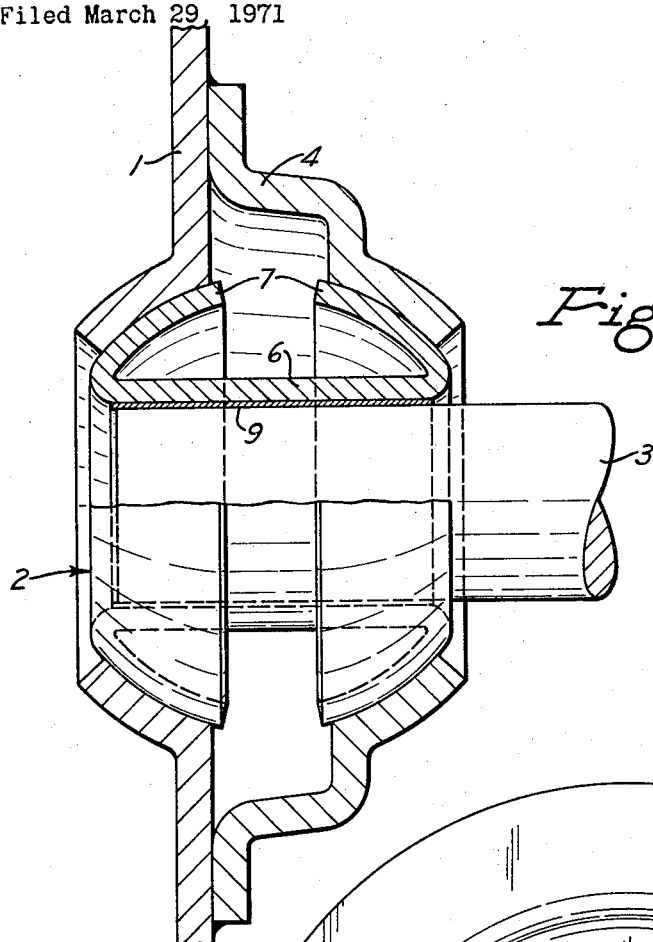
Figure 2:
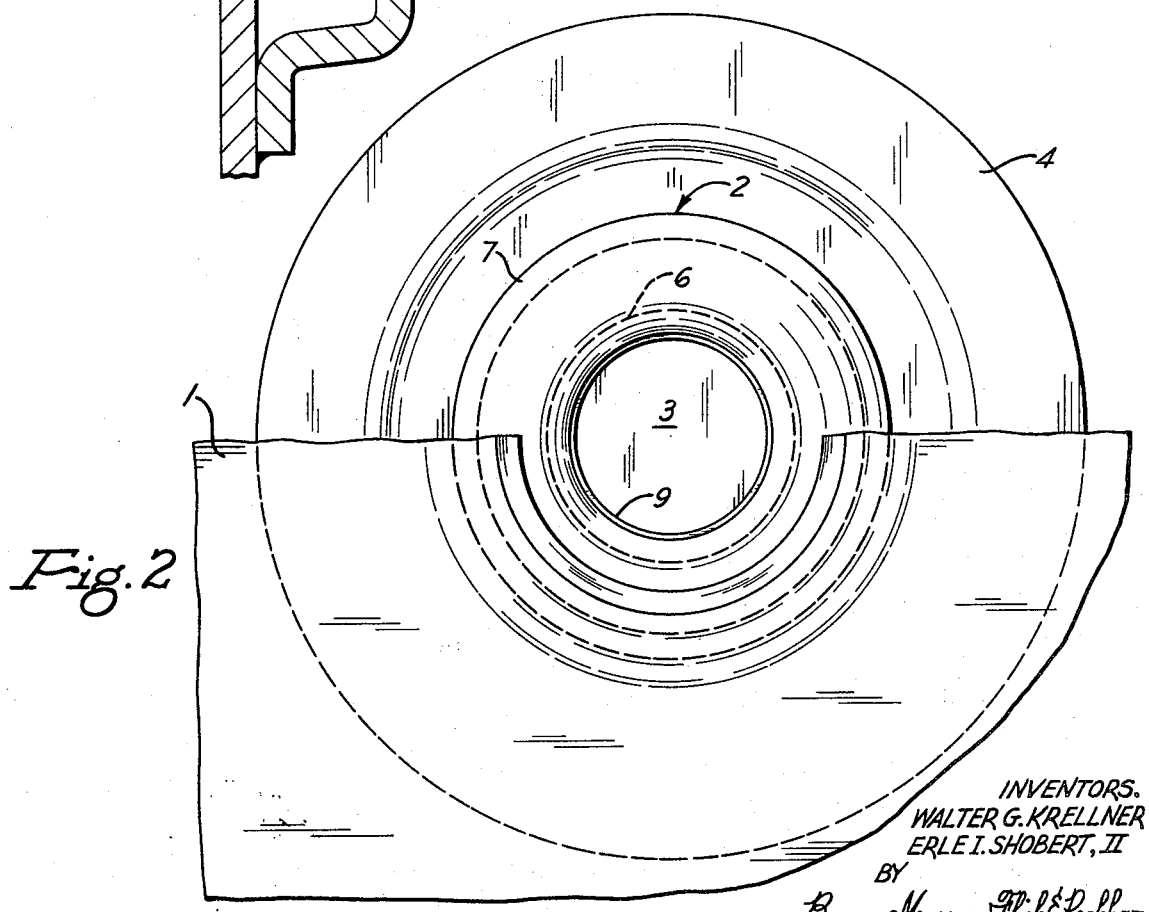
Figure 3:
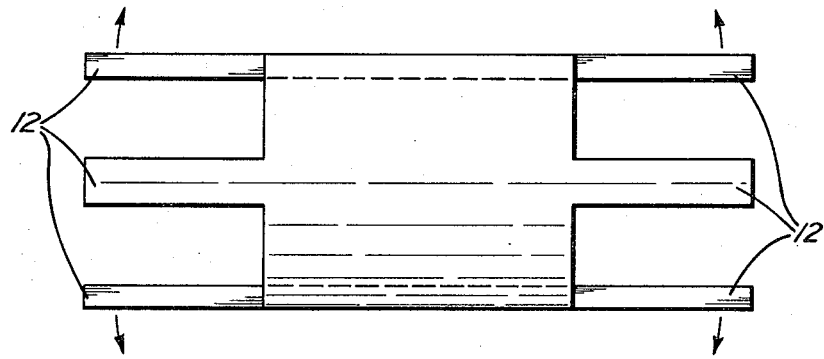
Figure 4:
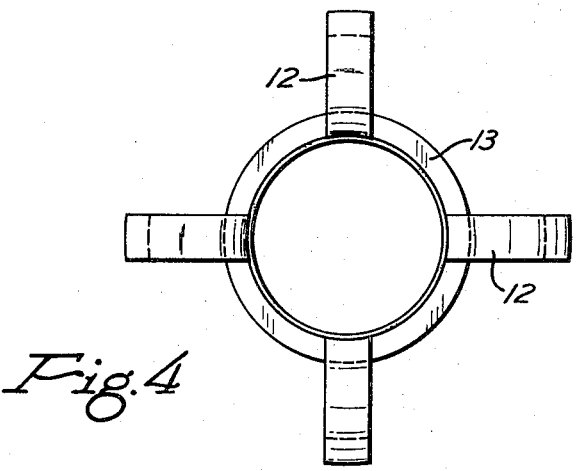
Figure 5:
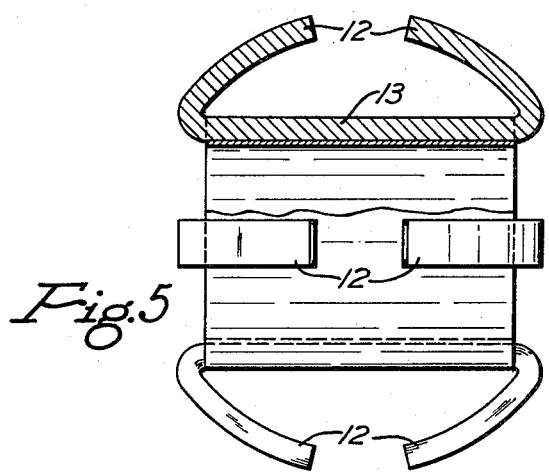

The preferred embodiment of the invention is illustrated in the accompanying drawings, in which:

FIG. 1 is a greatly enlarged side view of the bearing, partly in section and with its support entirely in section;
FIG. 2 is an end view, with part broken away;
FIG. 3 is a side view of a blank from which a modified embodiment of the invention is made;
FIG. 4 is an end view of the modified bearing; and
FIG. 5 is a side view, partly in section.

Referring to FIGS. 1 and 2 of the drawings, one end of an electric motor housing 1 is shown, in which there is an opening where the bearing 2 for one end of the motor shaft 3 is located and supported. The housing around the outer end of the opening is pressed outwardly to provide it with a concave inner surface. The inner end of the opening for the bearing is formed in a ring 4 secured to the inside of the housing and curved in a direction opposite to the wall at the outer end of the opening. The inner surfaces of these two curved walls, which form the side wall of the opening, lie in an imaginary spherical surface having its center at the center of the opening. Of course, th side wall of the housing opening could be solid instead of having the illustrated central space between its two parts.

The bearing 2 disposed in the housing opening is formed mainly from a one-piece metal member made from a short piece of metal tubing large enough to receive the motor shaft. The central portion 6 of the bearing member is tubular, but the end portions of the tubing have been spun outwardly and back toward each other to turn them inside out and form supporting end portions 7 for the central portion. The spun-out end portions encircle the end portions of the tubular portion of the bearing member and have curved outer surfaces that fit against the curved side wall of the housing opening in sliding engagement with it. In other words, the supporting end portions of the bearing are annular sections of a sphere and their outer surfaces lie in the surface of that sphere, the center of which coincides with the center of the imaginary sphere mentioned in the preceding paragraph. As a result, the bearing can rock or tilt in any direction in the housing opening as required. It is therefore self-aligning.

The inside of the tubular central portion of the bearing member can be equipped with a cylindrical liner 9 formed of graphite, a lubricating paint of graphite or molybdenum disulfide, or other solid lubricant, depending upon the severity of service and the life required. There is no necessity for using any oil in connection with this bearing. It is very economical to make because, except for the anti-friction lining, it is formed in one piece from a short piece of metal tubing, the opposite ends of which are readily spun out.

In the modification shown in the remaining figures of the drawings, the end portions of a piece of metal tubing are not spun outwardly, but are formed by slotting the ends of the tubing to provide two groups of circumferentially spaced longitudinal metal strips 12 as shown in FIG. 3. These strips then are bent outwardly and back over the end portions of the tubular central portion 13 of the bearing in a curve as shown in FIGS. 4 and 5, so that their outer surfaces (formerly their inner surfaces) will lie in an imaginary spherical surface having its center at the axis of the tubular portion of the bearing midway between its ends. For best results, there should be at least four of the curved strips at each end of the bearing. The bearing is very economical and easy to make. This bearing, when mounted in a motor housing opening such as shown in FIGS. 1 and 2, is self-aligning in the same manner as the bearing described first.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. A self-aligning bearing comprising a one-piece metal member having a tubular central portion for receiving a rotating shaft, and supporting end portions for the tubular portion integral with its opposite ends, said supporting portions being disposed around the outside of the tubular portion and curved back over it, and the supporting portions having outer surfaces lying in an imaginary spherical surface having its center at the axis of the tubular portion of said member midway between its ends.

2. A self-aligning bearing according to claim 1, in which there is only one of said supporting end portions at each end of the tubular portion of said member, and each supporting portion encircles an end portion of the tubular portion.

3. A self-aligning bearing according to claim 2, in which each of said supporting end portions is a spun-out end of the metal member.

4. A self-aligning bearing according to claim 1, in which there is a plurality of said supporting end portions at each end of the tubular portion of said member, each of the supporting portions being a metal strip spaced circumferentially of said member from like strips at the same end of said tubular portion.

5. A self-aligning bearing according to claim 1, including an anti-friction lining in said tubular portion of the metal member.

6. In combination, a bearing support provided with an opening therein having an encircling side wall with a surface lying in an imaginary spherical surface having its center at the center of said opening, and a one-piece metal bearing member disposed in said opening and having a tubular central portion for receiving a rotating shaft, said member also having supporting end portions for the tubular portion integral with its opposite ends, said supporting portions being disposed around the outside of the tubular portion and curved back over it, and the outer surfaces of the supporting portions being curved to fit against said side wall of the bearing support in sliding engagement therewith, whereby said bearing can tilt in any direction in said opening.

7. In the combination recited in claim 6, each of said supporting end portions of the bearing member being an annular section of a sphere.

References Cited
UNITED STATES PATENTS 2,891,816   6/1959   Josephson et al. _____ 308—72

MARTIN P. SCHWADRON, Primary Examiner

F. SUSKO, Assistant Examiner